(12) United States Patent
McClure

(10) Patent No.: US 7,830,124 B2
(45) Date of Patent: Nov. 9, 2010

(54) BATTERY MONITOR CIRCUIT AND METHOD FOR BATTERY TAMPER DETECTION

(75) Inventor: David McClure, Carrollton, TX (US)

(73) Assignee: STMicroelectronics, Inc., Carrollton, TX (US)

( * ) Notice: Subject to any disclaimer, the term of this patent is extended or adjusted under 35 U.S.C. 154(b) by 673 days.

(21) Appl. No.: 11/743,795

(22) Filed: May 3, 2007

(65) Prior Publication Data

US 2007/0257640 A1 Nov. 8, 2007

Related U.S. Application Data

(60) Provisional application No. 60/798,676, filed on May 8, 2006.

(51) Int. Cl.
*H02J 7/00* (2006.01)
(52) U.S. Cl. .................. 320/136; 320/134; 320/165; 324/426; 324/430; 324/433
(58) Field of Classification Search ............. 320/134, 320/136, 165; 324/426, 430, 433
See application file for complete search history.

(56) References Cited

U.S. PATENT DOCUMENTS 4,080,560 A * 3/1978 Abert ..................... 324/429
6,088,207 A * 7/2000 Sugiura et al. ............ 361/91.2
2006/0217873 A1* 9/2006 Phillips et al. ............. 701/114
2006/0267557 A1* 11/2006 Nakano et al. ............. 320/134

* cited by examiner

*Primary Examiner*—Edward Tso
*Assistant Examiner*—Arun Williams
(74) *Attorney, Agent, or Firm*—Lisa K. Jorgenson; Renee Michelle Leveque

(57) ABSTRACT

A battery monitor circuit. The circuit includes a control module, a resistive load having a resistive value between a first and a second terminals and a part of that resistive value between the first and an intermediate terminals, a switch configured to couple the full load between circuit input and a common potential in response a pulse signal, a first comparator having inputs separately coupled to a voltage reference and the intermediate terminal, a second comparator having inputs separately coupled to the voltage reference and an input potential, a latch, a detection module having input coupled to second comparator output, and an alarm module. The latch is configured to latch a value at output of first comparator to another input of the detection module in response to the pulse signal; if input potential is less than a preselected magnitude, detection module output is configured to activate the alarm module.

16 Claims, 5 Drawing Sheets

BATTERY MONITOR CIRCUIT AND METHOD FOR BATTERY TAMPER DETECTION

CROSS-REFERENCE TO RELATED APPLICATIONS

This application claims the benefit of U.S. Provisional Patent Application Ser. No. 60/798,676 filed on 8 May 2006, entitled "Battery Tamper Detection" which is hereby incorporated by reference in its entirety herein.

BACKGROUND

As the condition of a battery deteriorates, the equivalent internal resistance of the battery increases but its open circuit voltage does not similarly decrease. As such, the real condition of a battery can only be ascertained by placing the battery under load conditions prior to measuring its voltage. In this loaded condition, an operational current is drawn from the battery and an associated voltage drop occurs across the internal resistance of the battery which results in the measured voltage dropping below that of the open circuit battery. A significant drop in the voltage measured under load indicates that the battery is bad. Otherwise, the battery can be considered to still be good.

Batteries are often used for back-up power sources should the primary power source fail. In these instances, it would be inadvisable to continually draw an operation current from the battery as this would eventually deplete the battery and defeat its intended purpose of being available should the primary power source fail. Thus, it is typical to perform a battery test only at power-up and only over a short period of time which may be but a fraction of a second. Thus, the true condition of a battery is only really known for that short period of time during power-up. The battery is assumed to be good at other times if its measured voltage at that time was greater than a specified threshold value.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
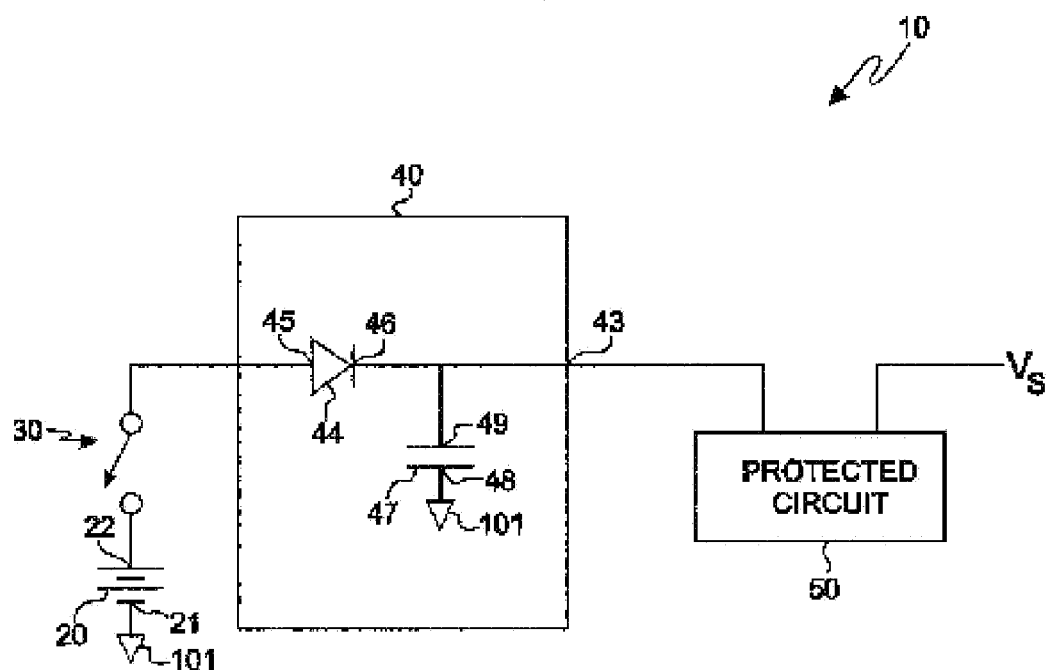
FIG. 1 is a circuit diagram of an electronic system.

As shown in the drawings for purposes of illustration, novel techniques are disclosed herein for providing a continuous indication of battery condition. Previous techniques for ascertaining the condition of a back-up battery have typically tested the battery only at power-up and then only over a short period of time. Thus, the true condition of the battery is not really known during large critical periods of time when the battery may be needed. During operational periods of time, a back-up battery can be removed or shorted out by, for example, an intruder. Then if the primary power source fails, the battery will not be able to perform its intended function.

To avoid this condition, battery monitor circuits are disclosed herein which perform two checks on the battery. The first occurs under loaded conditions to verify that the battery is, in fact, good, i.e., that it has sufficient capacity to perform as a back-up. The other test constantly monitors the unloaded battery voltage. This latter test verifies that the battery has not deteriorated to the point that the open circuit voltage has dropped below a specified threshold level. It will not guarantee that the battery will be able to provide adequate current should the primary power source fail. However, if the battery is tampered with while the device is powered-up, this tampering can be detected realtime and then warn the user of an intrusion.

In the following detailed description and in the several figures of the drawings, like elements are identified with like reference numerals.

FIG. 1 is a circuit diagram of an electronic system 10. In FIG. 1, the electronic system 10 comprises a battery 20, a battery switch 30, an isolation module 40, and a protected circuit 50. The battery 20 has a first battery terminal 21 and a second battery terminal 22. The isolation module 40 has an isolation-module input 41 and an isolation-module output 43. The isolation module 40 comprises a diode 44 and a capacitor 47. The diode 44 has a first diode terminal 45 and a second diode terminal 46, and the capacitor 47 has a first capacitor terminal 48 and a second capacitor terminal 49.

The first battery terminal 21 is coupled to the common potential 101, and the second battery terminal 22 is coupled to a terminal of the battery switch 30. The other terminal of the battery switch 30 is coupled to the isolation-module input 41. The isolation-module output 43 is coupled to the protected circuit 50 which is coupled to its own primary potential $V_S$. The protected circuit 50 can be any electronic circuit for which a back-up battery 20 is provided. The first diode terminal 45 is coupled to the isolation-module input 41. The second diode terminal 46 is coupled to the isolation-module output 43 and to the second capacitor terminal 49. The first capacitor terminal 48 is coupled to the common potential 101. If the input impedance of the protected circuit 50 be sufficiently large both when powered-up and when powered-down, use of the battery switch 30 is optional. In an alternative embodiment, the switch could be placed between the isolation-module output 43 and the protected circuit 50.

Figure 2:
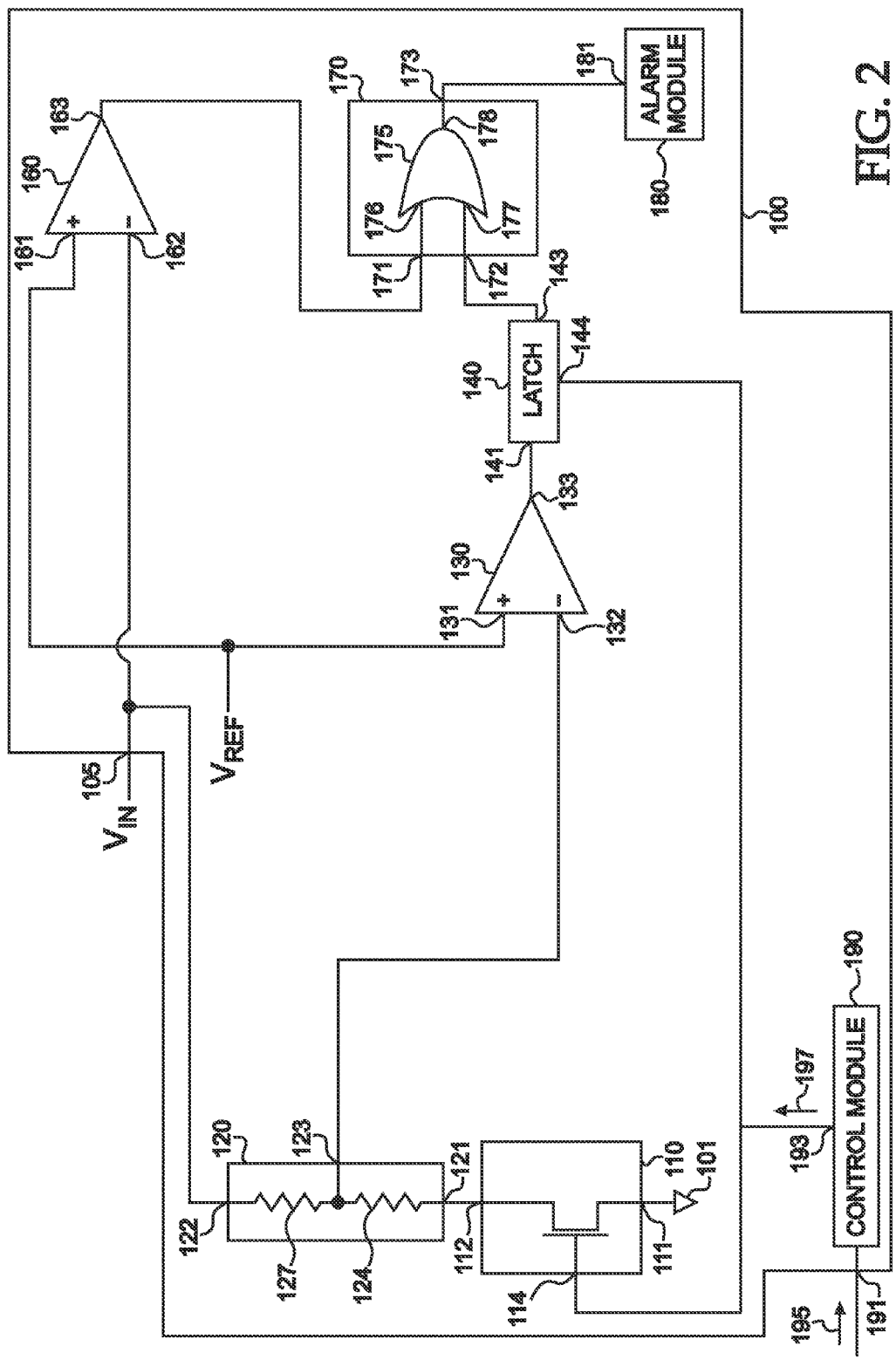
FIG. 2 is a circuit diagram of a battery monitor circuit as described in various representative embodiments.

FIG. 2 is a circuit diagram of a battery monitor circuit 100 as described in various representative embodiments. In FIG. 2, the battery monitor circuit 100 comprises a control module 190, a switch 110, a resistive load 120, a first comparator 130, a second comparator 160, a latch 140, a detection module 170, and an alarm module 180.

The battery monitor circuit 100 has a circuit input 105; the control module 190 has an optional control-module input 191 and a control-module output 193; the switch 110 has a first switch terminal 111, a second switch terminal 112, and a switch control input 114; the first comparator 130 has a first first-comparator input 131, a second first-comparator input 132, and a first-comparator output 133; the latch 140 has a latch input 141, a latch output 143, and a latch control input 144; the second comparator 160 has a first second-comparator input 161, a second second-comparator input 162, and a second-comparator output 163; the detection module 170 has a first detection-module input 171, a second detection-module input 172, and a detection-module output 173; and the alarm module 180 has an alarm-module input 181.

The first switch terminal 111 is coupled to the common potential 101; the second switch terminal 112 is coupled to the first terminal 121 of the resistive load 120; the control-module output 193 is coupled to the switch control input 114 and to the latch control input 144; the second terminal 122 of the resistive load 120 is coupled to the circuit input 105 and to the second second-comparator input 162; the first first-comparator input 131 is coupled to the voltage reference $V_{REF}$; the second first-comparator input 132 is coupled to the intermediate terminal 123 of the resistive load 120; the first-comparator output 133 is coupled to the latch input 141, the first second-comparator input 161 is coupled to the voltage reference $V_{REF}$; second-comparator output 163 is coupled to the first detection-module input 171; the latch output 143 is coupled to the second detection-module input 172; and the detection-module output 173 is coupled to the alarm-module input 181.

In FIG. 2, the resistive load 120 is a voltage divider 120 comprising a first resistor 124 coupled between the first terminal 121 and the intermediate terminal 123 and a second resistor 127 coupled between the intermediate terminal 123 and the second terminal 122. Further, the detection module 170 comprises an OR-circuit 175. The OR-circuit 175 has a first OR-circuit input 176, a second OR-circuit input 177, and an OR-circuit output 178. The first OR-circuit input 176 is coupled to the first detection-module input 171; the second OR-circuit input 177 is coupled to the second detection-module input 172, and the OR-circuit output 178 is coupled to the detection-module output 173. The latch 140 could be a SR latch, a flip-flop, or similar device having the ability to store a digital value.

In operation, the circuit input 105 of FIG. 2 can be coupled to the isolation-module input 41 or in an alternative embodiment coupled to the isolation-module output 43. A pulse signal 197 is outputted on the control-module output 193 by the control module 190 to couple the resistive load 120 to the circuit input 105 to enable checking the battery 20 under a load condition. The control module 190 can itself be optionally controlled by an externally applied control input signal 195 received at the control-module input 191. When the pulse signal 197 is received by the switch control input 114, the first and second switch terminals 111,112 are coupled together thereby placing the battery 20 in a loaded configuration as the resistive load 120 is coupled between the circuit input 105 and the common potential 101 via first and second switch terminals 111,112. During the period of the pulse signal 197 the potential at the intermediate terminal 123 is compared by the first comparator 130 to the voltage reference $V_{REF}$. If the potential at the intermediate terminal 123 falls below that of the voltage reference $V_{REF}$, a logic "1" is stored in the latch 140 which results in a logic "1" at the output of the detection module 170 (the OR-circuit 175) which in turn results in activation of the alarm module 180. However, if the potential at the intermediate terminal 123 stays above that of the voltage reference $V_{REF}$ during the period of the pulse signal 197, a logic "0" is stored in the latch 140 which results in a logic "0" at the output of the detection module 170 (the OR-circuit 175) which in turn does not result in activation of the alarm module 180 due to the resistive load test of the battery 20.

Once the pulse signal 197 is removed from the switch control input 114, the battery 20 returns to an unloaded condition and the latch output 143 (the second detection-module input 172) is latched to the logic value obtained during the load test. The unloaded potential of the battery 20 is then coupled to the circuit input 105 as the input potential $V_{IN}$ which is then compared to the voltage reference $V_{REF}$ by the second comparator 160.

If the potential at the circuit input 105 falls below that of the voltage reference $V_{REF}$, a logic "1" is outputted by the second comparator 160 at the second-comparator output 163 which in turn appears at the first detection-module input 171 and results in a logic "1" at the output of the detection module 170 (the OR-circuit 175) which in turn results in activation of the alarm module 180. However, if the potential at the circuit input 105 remains above that of the voltage reference $V_{REF}$ while the protected circuit 50 is powered-up, a logic "0" is outputted by the second comparator 160 at the second-comparator output 163 which in turn appears at the first detection-module input 171 and results in a logic "0" at the output of the detection module 170 (the OR-circuit 175), that is unless a logic "1" was stored at the latch output 143, which in turn does not result in activation of the alarm module 180 due to the on-going open circuit test of the battery 20.

Figure 3:
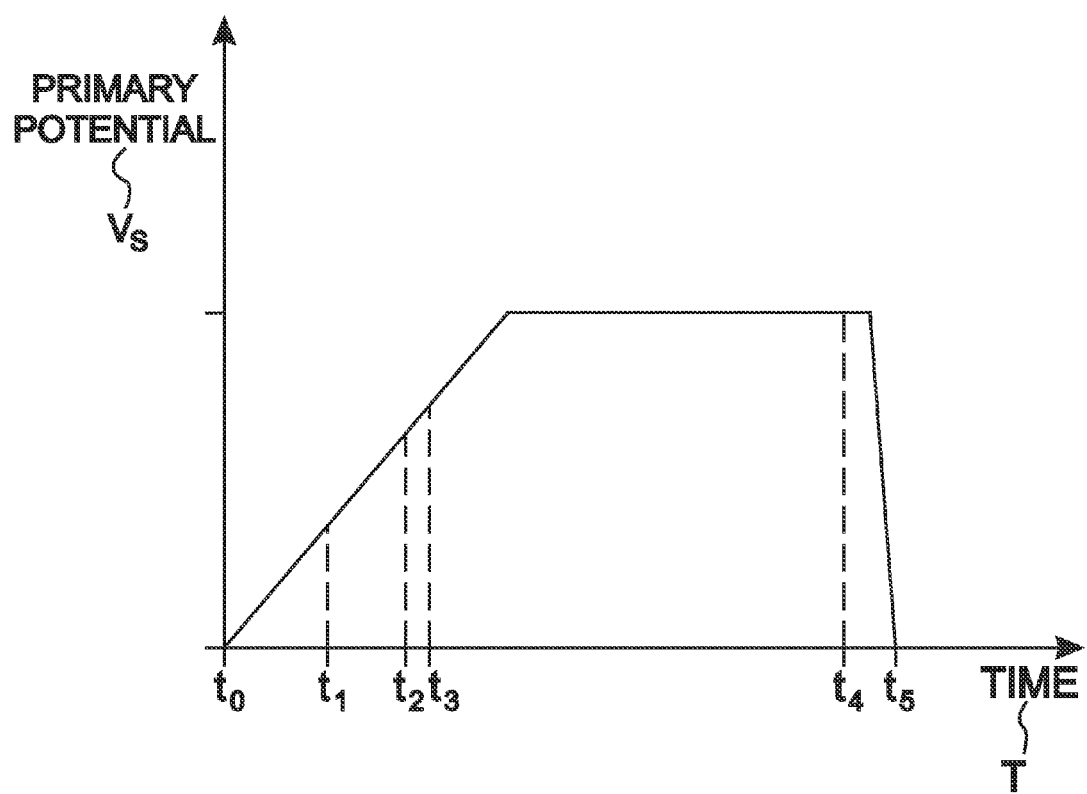
FIG. 3 is a plot of primary potential vs. time for the protected circuit of FIG. 1 as described in various representative embodiments.

FIG. 3 is a plot of primary potential $V_S$ vs. time T for the protected circuit 50 of FIG. 1 as described in various representative embodiments. In FIG. 3, at an initial time $t_0$, power-up of the electronic system 10 is initiated. At a first time $t_1$, the back-up battery 20 is coupled to the isolation module 40 by closing the battery switch 30. The pulse signal 197 is initiated at a second time $t_2$ and ends at a third time $t_3$. Between the second time $t_2$ and the third time $t_3$ the resistive load 120 is coupled to the circuit input 105 to enable checking the battery 20 under a load condition. At a fourth time $t_4$, the battery monitor circuit 100 detects that the battery 20 is bad, i.e., the open circuit voltage of the battery has dropped below a previously defined and set threshold value. The battery monitor circuit 100 then activates the alarm module 180 which has capability of notifying the protected circuit 50 of the battery's condition. At which time, the protected circuit 50 could immediately initiate a shutdown of itself. That shutdown is completed by a fifth time $t_5$. At the fourth time $t_4$, the battery 20 could have deteriorated sufficiently to activate the alarm module 180 due to usual physical mechanisms. Or the battery 20 could have been removed or shorted out by, for example, an intruder. In either case, should the primary power source fail, the battery 20 will not be able to perform its intended function. Thus, the safer option for the protected circuit 50 is to notify the user and to shut itself down or to allow the user to shut down the protected circuit 50.

Figure 4:
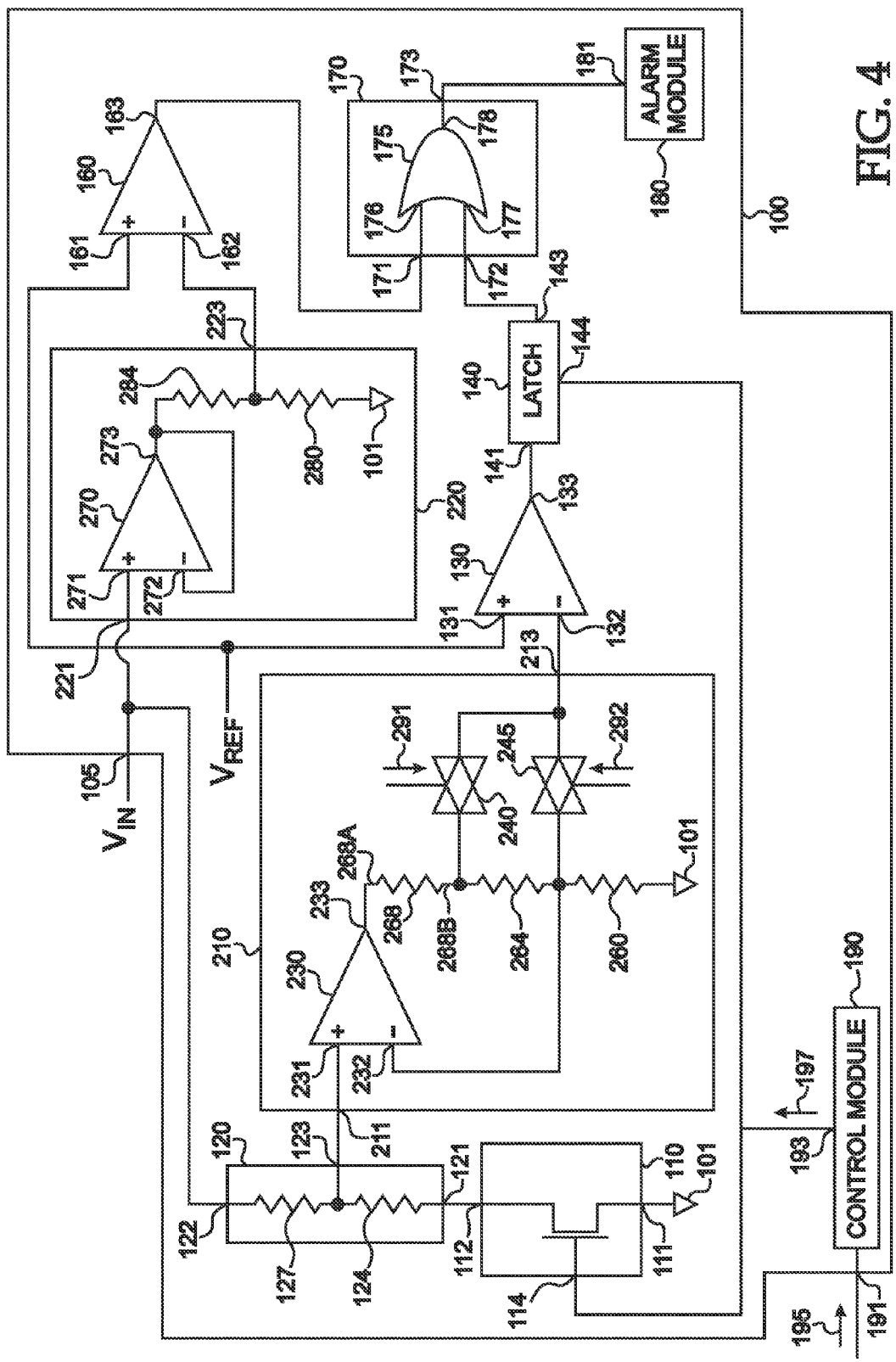
FIG. 4 is another circuit diagram of a battery monitor circuit as described in various representative embodiments.

FIG. 4 is another circuit diagram of a battery monitor circuit 100 as described in various representative embodiments. In FIG. 4, the battery monitor circuit 100 comprises the control module 190, the switch 110, the resistive load 120, the first comparator 130, the second comparator 160, the latch 140, the detection module 170, the alarm module 180, a trim module 210, and a step-down module 220. The trim module 210 comprises a first voltage follower 230, a first transmission gate 240, a second transmission gate 245, a third resistor 260, a fourth resistor 264, and a fifth resistor 268. The step-down module 220 comprises a second voltage follower 270, a sixth resistor 280, and a seventh resistor 284.

As in FIG. 2, the battery monitor circuit 100 has the circuit input 105; the control module 190 has the optional control-module input 191 and the control-module output 193; the switch 110 has the first switch terminal 111, the second switch terminal 112, and the switch control input 114; the first comparator 130 has the first first-comparator input 131, the second first-comparator input 132, and the first-comparator output 133; the latch 140 has the latch input 141, the latch output 143, and the latch control input 144; the second comparator 160 has the first second-comparator input 161, the second second-comparator input 162, and the second-comparator output 163; the detection module 170 has the first detection-module input 171, the second detection-module input 172, and the detection-module output 173; and the alarm module 180 has the alarm-module input 181. In addition, the trim module 210 has a trim-module input 211 and a trim-module output 213; the step-down module 220 has a step-down-module input 221 and a step-down-module output 223; the first voltage follower 230 has a first first-voltage-follower input 231, a second first-voltage-follower input 232, and a first-voltage-follower output 233; and the second voltage follower 270 has a first second-voltage-follower input 271, a second second-voltage-follower input 272, and a second-voltage-follower output 273.

As in FIG. 2, the first switch terminal 111 is coupled to the common potential 101; the second switch terminal 112 is coupled to the first terminal 121 of the resistive load 120; the control-module output 193 is coupled to the switch control input 114 and to the latch control input 144; the second terminal 122 of the resistive load 120 is coupled to the circuit input 105; the first first-comparator input 131 is coupled to the voltage reference $V_{REF}$; the first-comparator output 133 is coupled to the latch input 141, the first second-comparator input 161 is coupled to the voltage reference $V_{REF}$; second-comparator output 163 is coupled to the first detection-module input 171; the latch output 143 is coupled to the second detection-module input 172; and the detection-module output 173 is coupled to the alarm-module input 181.

Differing from FIG. 2, the intermediate terminal 123 of the resistive load 120 is coupled to the second first-comparator input 132 through the trim circuit 210. In particular, the trim-module input 211 is coupled directly to the intermediate terminal 123, and the trim-module output 213 is coupled directly to the second first-comparator input 132. Also differing from FIG. 2, the circuit input 105 is coupled to the second second-comparator input 162 through the step-down module 220. In particular, the step-down-module input 221 is coupled directly to the circuit input 105, and the step-down-module output 223 is coupled directly to the second second-comparator input 162.

Internally, the trim module 210 is coupled as follows: the first first-voltage-follower input 231 is coupled to the trim-module input 211, the third resistor 260 is coupled between the common potential 101 and the second first-voltage-follower input 232, the fourth resistor 264 is coupled between the third resistor 260 and the fifth resistor 268, the fifth resistor 268 is coupled between the fourth resistor 264 and the first-voltage-follower output 233, the first transmission gate 240 is coupled between the second first-comparator input 132 and the coupling of the fourth and the fifth resistors 264,268, and the second transmission gate 245 is coupled between the second first-comparator input 132 and the coupling of the third and the fourth resistors 260,264 with the second first-voltage-follower input 232.

Internally, the step-down module 220 is coupled as follows: first second-voltage-follower input 271 is coupled to the step-down-module input 221, the second-voltage-follower output 273 is coupled to the second second-voltage-follower input 272, the sixth resistor 280 is coupled between the common potential 101 and the seventh resistor 284, the seventh resistor 284 is coupled between the sixth resistor 280 and the second-voltage-follower output 273, and the coupling of the sixth and the seventh resistors 280,284 is coupled to the step-down-module output 223.

In FIG. 4, the resistive load 120 is a voltage divider 120 comprising a first resistor 124 coupled between the first terminal 121 and the intermediate terminal 123 and a second resistor 127 coupled between the intermediate terminal 123 and the second terminal 122. Further, the detection module 170 comprises an OR-circuit 175. The OR-circuit 175 has a first OR-circuit input 176, a second OR-circuit input 177, and an OR-circuit output 178. The first OR-circuit input 176 is coupled to the first detection-module input 171; the second OR-circuit input 177 is coupled to the second detection-module input 172, and the OR-circuit output 178 is coupled to the detection-module output 173. The voltage divider of the sixth and the seventh resistors 280,284 are used in the step-down module 220 to step down the input potential $V_{IN}$ to an appropriate value for comparison with the value of the voltage reference $V_{REF}$. The voltage divider of the third, the fourth and the fifth resistors 260,264,268 are used in the trim module 210 to trim the potential detected at the intermediate terminal 123 to an appropriate value for comparison with the value of the voltage reference $V_{REF}$. A first and a second trim signals 291,292 applied respectively to the first and the second transmission gates 240,245 can be used to appropriately trim the potential coupled to the second first-comparator input 132.

In operation, the circuit input 105 of FIG. 4 can be coupled to the isolation-module input 41 or in an alternative embodiment coupled to the isolation-module output 43. A pulse signal 197 is outputted on the control-module output 193 by the control module 190 to couple the resistive load 120 to the circuit input 105 to enable checking the battery 20 under a load condition. The control module 190 can itself be optionally controlled by an externally applied control input signal 195 received at the control-module input 191. While the pulse signal 197 is received by the switch control input 114, the first and second switch terminals 111,112 are coupled together thereby placing the battery 20 in a loaded configuration as the resistive load 120 is coupled between the circuit input 105 and the common potential 101 via first and second switch terminals 111,112. During the period of the pulse signal 197 the potential at the intermediate terminal 123 is coupled via the trim circuit to the second first-comparator input 132 to be compared by the first comparator 130 to the voltage reference $V_{REF}$. If the potential at the second first-comparator input 132 falls below that of the voltage reference $V_{REF}$, a logic "1" is stored in the latch 140 which results in a logic "1" at the output of the detection module 170 (the OR-circuit 175) which in turn results in activation of the alarm module 180. However, if the potential at the second first-comparator input 132 stays above that of the voltage reference $V_{REF}$ during the period of the pulse signal 197, a logic "0" is stored in the latch 140 which results in a logic "0" at the output of the detection module 170 (the OR-circuit 175) which in turn does not result in activation of the alarm module 180 due to the load test of the battery 20.

Once the pulse signal 197 is removed from the switch control input 114, the battery 20 returns to an unloaded condition and the latch output 144 (the second detection-module input 172) is latched to the logic value obtained during the load test. The unloaded potential of the battery 20 is then coupled to the circuit input 105 as the input potential $V_{IN}$ which is then compared to the voltage reference $V_{REF}$ by the second comparator 160.

If the potential at the step-down-module output 223 which is a reflection of the input potential $V_{IN}$ falls below that of the voltage reference $V_{REF}$, a logic "1" is outputted by the second comparator 160 at the second-comparator output 163 which in turn appears at the first detection-module input 171 and results in a logic "1" at the output of the detection module 170 (the OR-circuit 175) which in turn results in activation of the alarm module 180. However, if the potential at the step-down-module output 223 remains above that of the voltage reference $V_{REF}$ while the protected circuit 50 is powered-up, a logic "0" is outputted by the second comparator 160 at the second-comparator output 163 which in turn appears at the first detection-module input 171 and results in a logic "0" at the output of the detection module 170 (the OR-circuit 175), that is unless a logic "1" was stored at the latch output 143, which in turn does not result in activation of the alarm module 180 due to the on-going open circuit test of the battery 20.

Figure 5:
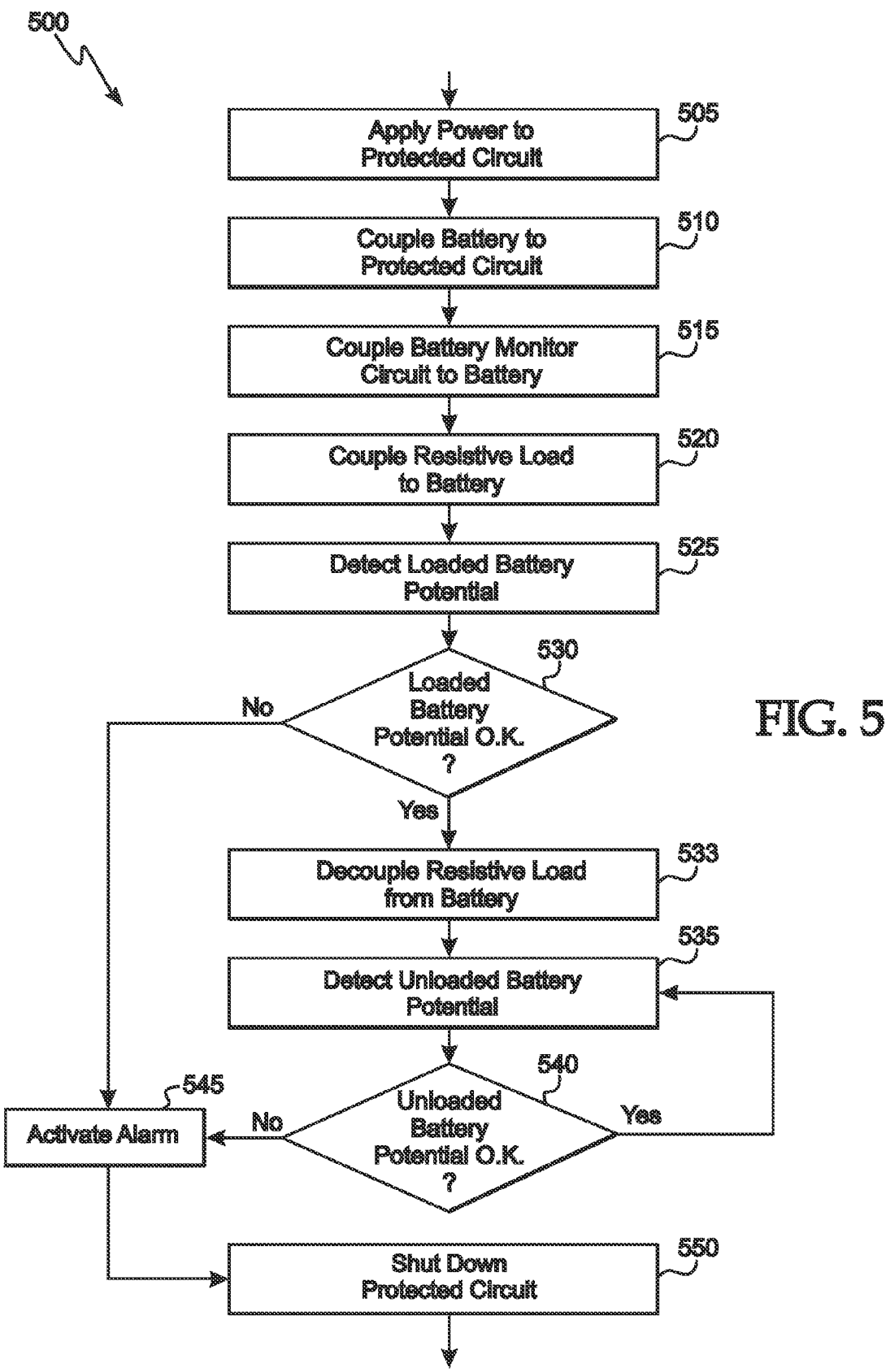
FIG. 5 is a flow chart of a method for monitoring a battery in the loaded and the unloaded configurations as described in various representative embodiments.

FIG. 5 is a flow chart of a method 500 for monitoring a battery 20 in the loaded and the unloaded configurations as described in various representative embodiments. In block 505, power is applied to the protected circuit 50. Block 505 then transfers control to block 510.

In block 510, the battery 20 is coupled to the protected circuit 50. Block 510 then transfers control to block 515.

In block 515, the battery monitor circuit 100 is coupled to the battery 20. Block 515 then transfers control to block 520.

In block 520, the resistive load 120 is coupled to the battery 20. Block 520 then transfers control to block 525.

In block 525, the loaded battery potential as reflected in the input potential VIN is detected. Block 525 then transfers control to block 530.

In block 530, if the loaded battery potential as reflected in the input potential $V_{IN}$ is acceptably high, block 530 transfers control to block 533. Otherwise, block 530 transfers control to block 545.

In block 533, the resistive load 120 is decoupled from the battery 20. Block 533 then transfers control to block 535.

In block 535, the unloaded battery potential as reflected in the input potential $V_{IN}$ is detected. Block 535 then transfers control to block 540.

In block 540, if the unloaded battery potential as reflected in the input potential $V_{IN}$ is acceptably high, block 540 transfers control back to block 535. Otherwise, block 540 transfers control to block 545.

In block 545, the alarm module 180 is activated. Block 545 then transfers control to block 550.

In block 550, the protected circuit 50 is shut-down. Block 550 then terminates the process.

As is the case, in many data-processing products, the systems described above may be implemented as a combination of hardware and software components. Moreover, the functionality required for use of the representative embodiments may be embodied in computer-readable media (such as floppy disks, conventional hard disks, DVDs, CD-ROMs, Flash ROMs, nonvolatile ROM, and RAM) to be used in programming an information-processing apparatus to perform in accordance with the techniques so described.

In a representative embodiment, a battery monitor circuit 100 is disclosed herein. The battery monitor circuit has a circuit input 105. The battery monitor circuit 100 comprises a control module 190 configured to output a pulse signal 197, a resistive load 120 having a full resistive value between a first and a second terminals 121,122 and a part of that resistive value between the first and an intermediate terminals 121, 123, a switch 110 configured to couple the resistive load 120 full value between the circuit input 105 and a common potential 101 in response to the pulse signal 197, a first comparator 130 having inputs 131,132 separately coupled to a voltage reference $V_{REF}$ and the intermediate terminal 123, a second comparator 160 having inputs 161,162 separately coupled to the voltage reference $V_{REF}$ and the circuit input 105, a latch 140, a detection module 170 having an input 171 coupled to second comparator 160 output 163, and an alarm module 180. The latch 140 is configured to latch a value at output 133 of the first comparator 130 to another input 172 of the detection module 170 in response to the pulse signal 197; the detection module 170 output 173 is coupled to the alarm module 180 input 181; and the value of the detection module 170 output 173 is configured to activate the alarm module 180 if an input potential $V_{IN}$ at the circuit input 105 is less than a preselected magnitude.

Battery monitor circuits are disclosed herein which perform two checks on the battery. The first occurs under loaded conditions to verify that the battery is, in fact, good, i.e., that it has sufficient capacity to perform as a back-up. The other test constantly monitors the unloaded battery voltage. This latter test verifies that the battery has not deteriorated to the point that the open circuit voltage has dropped below a specified threshold level. It will not guarantee that the battery will be able to provide adequate current should the primary power source fail. However, if the battery is tampered with while the device is powered up, this tampering can be detected realtime and then warn the user of an intrusion.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A battery monitor circuit having a circuit input, comprising:
   a control module configured to output a pulse signal;
   a resistive load having a resistive value between a first and a second terminals and a part of that resistive value between the first and an intermediate terminals;
   a switch configured to couple the full value of the resistive load between the circuit input and a common potential in response to the pulse signal;
   a first comparator having inputs coupled separately to a voltage reference and to the intermediate terminal;
   a second comparator having inputs coupled separately to the voltage reference and to the circuit input;
   a latch;
   a detection module having an input coupled to second comparator output, wherein the latch is configured to latch a value at output of the first comparator to another input of the detection module in response to the pulse signal;
   an alarm module, wherein detection module output is coupled to alarm module input and wherein value of the detection module output is configured to activate the alarm module if an input potential at the circuit input is less than a preselected magnitude; and
   a step-down module, wherein the second comparator input coupled to the voltage reference is first second-comparator input and the second comparator input coupled to the circuit input is second second-comparator input, wherein the second second-comparator input is coupled to the circuit input through the step-down module, and wherein the step-down module is configured to enable stepping down adjustment of the input potential coupled to the second second-comparator input.

2. The battery monitor circuit as recited in claim 1, wherein the step-down module comprises a second voltage follower having a first second-voltage-follower input, a second second-voltage-follower input, and a second-voltage-follower output, a sixth resistor, and a seventh resistor, wherein the first second-voltage-follower input is coupled to the circuit input, wherein the second second-voltage-follower input is coupled to the second-voltage-follower output, wherein the sixth resistor is coupled between the second-voltage-follower output and the second second-comparator input, and wherein the seventh resistor is coupled between the common potential and the second second-comparator input.

3. The battery monitor circuit as recited in claim 1, wherein the control module has a control-module output on which the pulse signal is outputted, wherein the switch has a first switch terminal, a second switch terminal, and a switch control input, wherein the first comparator has first first-comparator input, second first-comparator input, and first-comparator output, wherein the latch has a latch input, a latch output, and a latch control input, wherein the second comparator has first second-comparator input, second second-comparator input, and second-comparator output, wherein the detection module has first detection-module input, second detection-module input, and detection-module output, wherein the first switch terminal is coupled to the common potential, wherein the second switch terminal is coupled to the first terminal, wherein the control-module output is coupled to the switch control input and to the latch control input, wherein the second terminal is coupled to the circuit input, wherein the first first-comparator input is coupled to the voltage reference, wherein the second first-comparator input is coupled to the intermediate terminal, wherein the first-comparator output is coupled to the latch input, wherein the first second-comparator input is coupled to the voltage reference, wherein the second second-comparator input is coupled to circuit input, wherein the second-comparator output is coupled to the first detection-module input, and wherein the latch output is coupled to the second detection-module input.

4. The battery monitor circuit as recited in claim 3, wherein the switch is an n-channel metal-oxide-semiconductor field effect transistor having its source coupled to the first switch terminal, its drain coupled to the second switch terminal, and its gate coupled to the switch control input.

5. The battery monitor circuit as recited in claim 3, wherein the load comprises a first resistor coupled between the first terminal and the intermediate terminal and a second resistor coupled between the intermediate terminal and the second terminal.

6. The battery monitor circuit as recited in claim 3, wherein the detection module is an OR-circuit having a first OR-circuit-module input coupled to the first detection-module input, a second OR-circuit-module input coupled to the second detection-module input, and an OR-circuit-module output coupled to the detection-module output.

7. The battery monitor circuit as recited in claim 3, wherein the first first-comparator input is the positive input terminal of the first comparator, wherein the second first-comparator input is the negative input terminal of the first comparator, wherein the first second-comparator input is the positive input terminal of the second comparator, and wherein the second second-comparator input is the negative input terminal of the second comparator.

8. The battery monitor circuit as recited in claim 1, wherein a battery has a first battery terminal coupled to the common potential and a second battery terminal coupled to the circuit input.

9. The battery monitor circuit as recited in claim 1, wherein a battery has a first battery terminal coupled to the common potential and a second battery terminal, wherein an isolation module has an isolation-module input coupled to the second battery terminal and an isolation-module output, wherein the isolation module comprises a diode having a first diode terminal coupled to the isolation-module input and a second diode terminal coupled to the isolation-module output, wherein the isolation module comprises a capacitor having a first capacitor terminal coupled to the common potential and a second capacitor terminal coupled to the isolation-module output, and wherein the circuit input is coupled to the isolation-module output.

10. A battery monitor circuit having a circuit input comprising:
   a control module configured to output a pulse signal;
   a resistive load having a resistive value between a first and a second terminals and a part of that resistive value between the first and an intermediate terminals;
   a switch configured to couple the full value of the resistive load between the circuit input and a common potential in response to the pulse signal;
   a first comparator having inputs coupled separately to a voltage reference and to the intermediate terminal;
   a second comparator having inputs coupled separately to the voltage reference and to the circuit input;
   a latch;
   a detection module having an input coupled to second comparator output, wherein the latch is configured to latch a value at output of the first comparator to another input of the detection module in response to the pulse signal;
   an alarm module, wherein detection module output is coupled to alarm module input and wherein value of the detection module output is configured to activate the alarm module if an input potential at the circuit input is less than a preselected magnitude; and
   a trim module, wherein the first comparator input coupled to the voltage reference is first first-comparator input and the first comparator input coupled to the intermediate terminal is second first-comparator input, wherein the second first-comparator input is coupled to the intermediate terminal through the trim module, and wherein the trim module is configured to enable adjustment of the potential coupled to the second first-comparator input.

11. The battery monitor circuit as recited in claim 10, wherein the trim module comprises a first voltage follower having a first first-voltage-follower input, a second first-voltage-follower input, and a first-voltage-follower output, a third resistor, a fourth resistor, a fifth resistor having a first fifth-resistor terminal and a second fifth-resistor terminal, a first transmission gate, and a second transmission gate, wherein the first first-voltage-follower input is coupled to the intermediate terminal, wherein the third resistor is coupled between the second first-voltage-follower input and the common potential, wherein the first fifth-resistor terminal is coupled to the first-voltage-follower output, wherein the fourth resistor is coupled between the second fifth-resistor terminal and the second first-voltage-follower input, wherein the first transmission gate is coupled between the second fifth-resistor terminal and the second first-comparator input, wherein the second transmission gate is coupled between the second first-voltage-follower input and the second first-comparator input, wherein the first transmission gate is turned on and off by a first trim signal applied to the first transmission gate, and wherein the second transmission gate is turned on and off by a second trim signal applied to the second transmission gate.

12. A battery monitor circuit having a circuit input comprising:
   a control module configured to output a pulse signal;
   a resistive load having a resistive value between a first and a second terminals and a part of that resistive value between the first and an intermediate terminals;
   a switch configured to couple the full value of the resistive load between the circuit input and a common potential in response to the pulse signal;

a first comparator having inputs coupled separately to a voltage reference and to the intermediate terminal;
a second comparator having inputs coupled separately to the voltage reference and to the circuit input;
a latch;
a detection module having an input coupled to second comparator output, wherein the latch is configured to latch a value at output of the first comparator to another input of the detection module in response to the pulse signal;
an alarm module, wherein detection module output is coupled to alarm module input and wherein value of the detection module output is configured to activate the alarm module if an input potential at the circuit input is less than a preselected magnitude; and
a trim module, wherein the first comparator input coupled to the voltage reference is first first-comparator input and the first comparator input coupled to the intermediate terminal is second first-comparator input, wherein the second first-comparator input is coupled to the intermediate terminal through the trim module, wherein the trim module comprises a first voltage follower having a first first-voltage-follower input, a second first-voltage-follower input, and a first-voltage-follower output, a third resistor, a fourth resistor, a fifth resistor having a first fifth-resistor terminal and a second fifth-resistor terminal, a first transmission gate, and a second transmission gate, wherein the first first-voltage-follower input is coupled to the intermediate terminal, wherein the third resistor is coupled between the second first-voltage-follower input and the common potential, wherein the first fifth-resistor terminal is coupled to the first-voltage-follower output, wherein the fourth resistor is coupled between the second fifth-resistor terminal and the second first-voltage-follower input, wherein the first transmission gate is coupled between the second fifth-resistor terminal and the second first-comparator input, wherein the second transmission gate is coupled between the second first-voltage-follower input and the second first-comparator input, wherein the first transmission gate is turned on and off by a first trim signal applied to the first transmission gate, and wherein the second transmission gate is turned on and off by a second trim signal applied to the second transmission gate,
wherein the control module has a control-module output on which the pulse signal is outputted, wherein the switch has a first switch terminal, a second switch terminal, and a switch control input, wherein the first comparator has first first-comparator input, second first-comparator input, and first-comparator output, wherein the latch has a latch input, a latch output, and a latch control input, wherein the second comparator has first second-comparator input, second second-comparator input, and second-comparator output, wherein the detection module has first detection-module input, second detection-module input, and detection-module output, wherein the first switch terminal is coupled to the common potential, wherein the second switch terminal is coupled to the first terminal, wherein the control-module output is coupled to the switch control input and to the latch control input, wherein the second terminal is coupled to the circuit input, wherein the first first-comparator input is coupled to the voltage reference, wherein the second first-comparator input is coupled to the intermediate terminal, wherein the first-comparator output is coupled to the latch input, wherein the first second-comparator input is coupled to the voltage reference, wherein the second second-comparator input is coupled to circuit input, wherein the second-comparator output is coupled to the first detection-module input, and wherein the latch output is coupled to the second detection-module input.

13. A battery monitor circuit having a circuit input comprising:
a control module configured to output a pulse signal;
a resistive load having a resistive value between a first and a second terminals and a part of that resistive value between the first and an intermediate terminals;
a switch configured to couple the full value of the resistive load between the circuit input and a common potential in response to the pulse signal;
a first comparator having inputs coupled separately to a voltage reference and to the intermediate terminal;
a second comparator having inputs coupled separately to the voltage reference and to the circuit input;
a latch;
a detection module having an input coupled to second comparator output, wherein the latch is configured to latch a value at output of the first comparator to another input of the detection module in response to the pulse signal;
an alarm module, wherein detection module output is coupled to alarm module input and wherein value of the detection module output is configured to activate the alarm module if an input potential at the circuit input is less than a preselected magnitude; and
a step-down module, wherein the second comparator input coupled to the voltage reference is first second-comparator input and the second comparator input coupled to the circuit input is second second-comparator input, wherein the second second-comparator input is coupled to the circuit input through the step-down module, wherein the step-down module comprises a second voltage follower having a first second-voltage-follower input, a second second-voltage-follower input, and a second-voltage-follower output, a sixth resistor, and a seventh resistor, wherein the first second-voltage-follower input is coupled to the circuit input, wherein the second second-voltage-follower input is coupled to the second-voltage-follower output, wherein the sixth resistor is coupled between the second-voltage-follower output and the second second-comparator input, and wherein the seventh resistor is coupled between the common potential and the second second-comparator input,
wherein the control module has a control-module output on which the pulse signal is outputted, wherein the switch has a first switch terminal, a second switch terminal, and a switch control input, wherein the first comparator has first first-comparator input, second first-comparator input, and first-comparator output, wherein the latch has a latch input, a latch output, and a latch control input, wherein the second comparator has first second-comparator input, second second-comparator input, and second-comparator output, wherein the detection module has first detection-module input, second detection-module input, and detection-module output, wherein the first switch terminal is coupled to the common potential, wherein the second switch terminal is coupled to the first terminal, wherein the control-module output is coupled to the switch control input and to the latch control input, wherein the second terminal is coupled to the circuit input, wherein the first first-comparator input is coupled to the voltage reference, wherein the second first-comparator input is coupled to the intermediate terminal, wherein the first-comparator output is coupled to the latch input, wherein the first second-comparator input is coupled to the voltage reference, wherein the second second-comparator input is coupled to circuit input, wherein the second-comparator output is coupled to the first detection-module input, and wherein the latch output is coupled to the second detection-module input.

14. A method for monitoring a battery in a loaded and in an unloaded configuration, comprising:
applying power to a protected circuit;
coupling the battery to the protected circuit;
coupling a battery monitor circuit having an input to the battery;
coupling a resistive load to the battery;
detecting the loaded battery potential as reflected in an input potential at the input to the battery monitor circuit; and
if the loaded battery potential as reflected in the input potential is acceptably high:
  decoupling the resistive load from the battery,
  detecting the unloaded battery potential as reflected in the input potential, and
  if the unloaded battery potential as reflected in the input potential is acceptably high:
    repeating decoupling the resistive load from the battery, detecting the unloaded battery potential, and performing this condition of determining if the unloaded battery potential as reflected in the input potential is acceptably high,
  if the loaded battery potential as reflected in the input potential is not acceptably high:
    activating the alarm module and
    shutting down the protected circuit,
otherwise:
  activating an alarm module and
  shutting down the protected circuit.

15. The method as recited in claim 14, wherein the battery monitor circuit comprises:
  a control module configured to output a pulse signal,
  a resistive load having a resistive value between a first and a second terminals and a part of that resistive value between the first and an intermediate terminals,
  a switch configured to couple the full value of the resistive load between the circuit input and a common potential in response to the pulse signal,
  a first comparator having inputs coupled separately to a voltage reference and to the intermediate terminal,
  a second comparator having inputs coupled separately to the voltage reference and to the circuit input,
  a latch,
  a detection module having an input coupled to second comparator output, and
  the alarm module,
wherein the latch is configured to latch a value at output of the first comparator to another input of the detection module in response to the pulse signal, wherein detection module output is coupled to alarm module input, and wherein value of the detection module output is configured to activate the alarm module if an input potential at the circuit input is less than a preselected magnitude.

16. A battery monitor circuit having a circuit input, comprising:
  means for applying power to a protected circuit;
  means for coupling a battery to the protected circuit;
  means for coupling a battery monitor circuit having an input to the battery;
  means for coupling a resistive load to the battery;
  means for detecting the loaded battery potential as reflected in an input potential at the input to the battery monitor circuit; and
  if the loaded battery potential as reflected in the input potential is acceptably high:
    means for decoupling the resistive load from the battery and
    means for detecting the unloaded battery potential as reflected in the input potential, and
  otherwise:
    means for activating an alarm module and
    means for shutting down the protected circuit; and
  if the unloaded battery potential as reflected in the input potential is unacceptably low:
    means activating the alarm module and
    means for shutting down the protected circuit.

* * * * *